United States Patent [19]

Tochioka

[11] Patent Number: 6,037,420
[45] Date of Patent: *Mar. 14, 2000

[54] POLYMER COMPOSITE MATERIAL AND METHOD FOR PREPARING THE SAME

[75] Inventor: Takahiro Tochioka, Hiroshima-ken, Japan

[73] Assignee: Mazda Motor Corporation, Hiroshima-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/565,887

[22] Filed: Dec. 1, 1995

Related U.S. Application Data

[63] Continuation of application No. 08/274,856, Jul. 14, 1994, abandoned.

[30] Foreign Application Priority Data

Jul. 16, 1993 [JP] Japan ..................................... 5-176517

[51] Int. Cl.[7] ...................................................... C08L 77/00
[52] U.S. Cl. .......................... 525/420; 525/425; 525/432; 525/434; 525/437; 525/444; 525/450; 525/466; 428/338; 428/339
[58] Field of Search .................................... 525/432, 425, 525/420, 434; 428/338, 339

[56] References Cited

U.S. PATENT DOCUMENTS

| | | | |
|---|---|---|---|
| 3,778,410 | 12/1973 | Kuhfuss et al. | ......................... 525/437 |
| 4,228,218 | 10/1980 | Takayanagi . | |
| 5,266,658 | 11/1993 | Dashevsky | ............................... 525/444 |
| 5,324,795 | 6/1994 | Suenaga | ................................... 525/444 |

FOREIGN PATENT DOCUMENTS

| | | |
|---|---|---|
| 041 327 | 12/1981 | European Pat. Off. . |
| 242 987 | 10/1987 | European Pat. Off. . |
| 312 013 | 4/1989 | European Pat. Off. . |
| 55-500440 | 7/1980 | Japan . |
| 61-5500 | 2/1986 | Japan . |

*Primary Examiner*—Patricia A. Short
*Attorney, Agent, or Firm*—Morrison & Foerster LLP

[57] ABSTRACT

The polymer composite material is produced using no solvent and includes a rigid polymer (B) dispersed uniformly into a matrix (A) at the molecular level in a state of a copolymer (A/B and/or A'/B) thereby enhancing the interface bonding of the rigid polymer (B) to the matrix (A). The non-solvent method includes a step of polymerizing a thermoplastic polymer (A) and a monomer to form a rigid polymer (B) with no solvent in the molten and kneaded state to provide a copolymer (A/B and/or A'/B) in which the flexible molecular chains (A and/or A') are made up of the thermoplastic polymer to the rigid polymer (B) to reduce the stress concentrating sources of the rigid polymer dispersed microscopically at the molecular level in the thermoplastic polymer matrix and enhance the interface bonding between the rigid polymer (B) and the matrix (A).

17 Claims, 2 Drawing Sheets

POLYMER COMPOSITE MATERIAL AND METHOD FOR PREPARING THE SAME

This application is a continuation of U.S. application Ser. No. 08/274,856, filed Jul. 14, 1994, now abandoned.

BACKGROUND OF THE INVENTION

1. Field of the Invention

The present invention relates to a polymer composite material reinforced by dispersion of a rigid polymer in a thermoplastic polymer matrix at the molecular level and a method for preparing said composite.

2. Prior Art

Unique properties are generally established in a polymer material due to its high-order structure. The high-order structure is influenced by such a primary structure as molecular weight, molecular weight distribution, crystallinity, orientation and so on, particularly depends largely on its molecular structure. Therefore, there has been proposed macro fiber reinforced composite materials since the past so as to overcome the limit of mechanical properties, which occur naturally.

Examples of filament fibers having a high elastic modulus and a high strength used as a macro fiber reinforced composite material include carbon fibers, glass fibers, alamide fibers and so on. However, these fibers are usually aggregates of fibril and micro fibril and thus contain defects at each place which cause micro cracks. For example, the ends of molecular chains, micro fibrils or fibers, which are propagation paths of destruction cracks, are stressed higher than the average stress in the structure subjected to an external force, that causes concentration of the stress. And since the diameter of the filament is about 10 $\mu$m, an interface bonding between the fiber and the matrix must be strong enough to distribute the external stress uniformly over oriented fibers in the matrix and draw out a possible ultimate property of the fiber.

As for these problems of the structural defects of the macro fiber and the interface bonding, the far-reaching effects of the fatal defects can be reduced and the strength can be enhanced by minuteness of the diameter. That is, the minuteness of the diameter prevents the stress from concentrating at a local part and increase its aspect ratio UD (L and D are the length and the diameter of the reinforced fiber, respectively), thereby increasing the contact area, with the result that the problem of the interface bonding with the matrix molecule can be eliminated. Therefore, it is a best mode to disperse the rigid polymer in the matrix, which mode makes a critical aspect ratio easily achieved if the molecular diameter of the rigid polymer is D, resulting in establishment of the theoretical strength of the molecule if the interface bonding between the fiber and the matrix is enough since rupture of the composite material means rupture of the covalent bond of the molecular chain in the composite material. The rigid molecular chain structure provides the resulting crystal with a molecular chain rigidity due to its molecular structure and also a high strength in the direction of the molecular chain such as the molecular chain can not be folded. A foldable chain structure usually causes a defect at the folded part. Moreover, since a non-crystal part is a propagation path of the destruction crack due to a small number of covalent bonds, the rigid polymer can improves the strength of the composite material.

Therefore, if the molecular chain of the reinforcing polymer has a rigidity over a certain limit and can be dispersed microscopically and uniformly in the matrix polymer, it is expected that a small addition of the reinforcing polymer enhances various kinds of mechanical properties without a decline of the processability.

Hitherto, based on the above idea, concepts of the polymer composite are proposed in Japanese Patent Publication Tokkosho No. 61-5500 and International Patent Domestic Publication No. Sho 55-500440. These prior polymer composites are basically made according to the method in which one polymer and the other polymer are mixed uniformly with the solvent. At the present technical level, it is very difficult to disperse and mix those polymers very uniformly in the matrix, so that we have a problem that many resulting reinforcing materials (agglomerates of the rigid polymer) often have a diameter exceeding a few microns. Further, it is disadvantageous that we can not use a polymer which is not compatible with a solvent to be used. Moreover, since the use of solvent is regulated by law from various view points at present, it is preferable to provide a non-solvent method.

THE SUMMARY OF THE INVENTION

Then, it is a first object of the present invention to provide a polymer composite material which can be prepared according to a non-solvent method, wherein a reinforcing material (rigid polymer) can be dispersed uniformly at the molecular level, thereby the bonding strength between molecular chain ends and the interface bonding between the micro fiber and the matrix can be enhanced and thus the disadvantageous conditions to destruction can be eliminated.

A second object of the present invention is to provide a non-solvent method for preparing the above polymer composite material.

Therefore, according to an aspect of the present invention, there is provided a polymer composite material comprising two or more kinds of polymers including a rigid polymer (B) having rigid molecular chains as a reinforcing component and a thermoplastic polymer (A) having flexible molecular chains as a matrix component, wherein at least a part of said reinforcing component is constituted by a copolymer (A-B and/or A'-B) of the rigid polymer (B) and the thermoplastic polymer (A) and/or a thermoplastic polymer (A') compatible with said polymer (A), the rigid molecular chain parts of said reinforcing component being dispersed microscopically at the molecular level in the matrix (A), and the flexible molecular chain part of said thermoplastic polymer (A) and/or (A') which has a covalent bonding with the rigid molecular chain part being in a state of melting substantially uniformly into said matrix component (A).

In an embodiment of the polymer composite material, it is preferable that the rigid polymer (B) is a rod-like reinforcing material having a cross-sectional diameter of 0.07$\mu$ or less when cut at right angles to the longitudinal direction.

According to a second aspect of the present invention, there is provided a method for producing a polymer composite material comprising at least two kinds of polymers wherein one is a rigid polymer (B) as a reinforcing component having rigid molecular chains and the other is a thermoplastic polymer (A) having flexible molecular chains as a matrix component, which comprises:

a step of mixing a monomer to form the rigid polymer (B) with the thermoplastic polymer (A) or the thermoplastic polymer (A') compatible with said polymer (A) at the prescribed ratio;

a step of polymerizing said monomer with no solvent in the molten and mixed state to give the rigid polymer (B), a step of covalent bonding the rigid molecular chain parts of the rigid polymer (B) and the flexible molecular chain parts of the thermoplastic polymer (A) and/or (A') by means of transesterification, transamidation or ester-amide exchange reaction; and a step of melting and mixing the residual thermoplastic polymer while inhibiting the reaction between the foreign molecules.

DETAILED DESCRIPTION OF THE INVENTION

Figure 1:
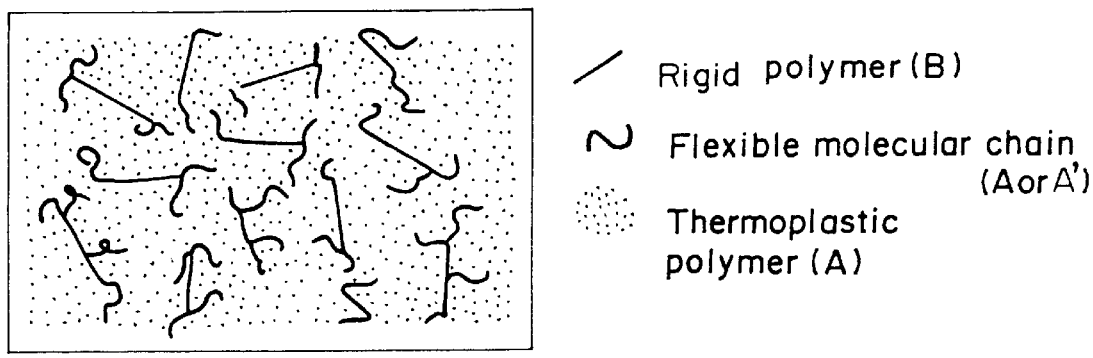
FIG. 1 is a drawing showing the internal constitution of the micro fiber reinforced composite according to the present invention.

According to the present invention, as shown in FIG. 1, the rigid polymer (B) can be dispersed as a micro fiber microscopically at the molecular level into the matrix (A) with no solvent by melting and mixing. At the same time, the flexible molecular chain (A or A') composed of the same polymer as the matrix (A) or the polymer (A') compatible with said matrix (A) is copolymerized with the rigid polymer (B) to give a copolymer (A-B or A'-B) as a reinforcing component, which results in reduction of the stress concentration sources (which are the ends of the rigid polymer chains) and also enhancement of the interface bonding between the reinforcing fiber (B) and the matrix (A) due to the anchor effect of the flexible molecular chain (A or A') of the copolymer (A-B or A'-B) into the matrix (A). Accordingly, a small addition of the rigid component (A-B or A'-B) can enhance extremely not only strength and rigidity but also ductility and shock resistance (which is an energy required for destruction and expressed as an occupying area of the stress-strain curve) which could not be realized in the prior art.

In the present invention, the polymers to be used can be classified into two types, that is, one is a thermoplastic polymer having flexible molecular chains (A or A') and the other is a rigid polymer having rigid molecular chains (B). The rigid polymer in the present invention means that bonding of a polymer chain is strong, the occupying cross-sectional area of the polymer chain is small, and elongation of the polymer chain is small. If any polymer fulfills this definition, it can be called a rigid polymer. To be more concrete, the rigidity can be expressed by using both a theoretical crystal elastic modulus Ec and a theoretical strength ab at the time of destruction. The theoretical crystal elastic modulus Ec and theoretical strength abc are defined as follows.

How to calculate the theoretical crystal elastic modulus Ec and the theoretical strength abc at the time of destruction:

First, in a case of one polymer chain, a power F is given to the polymer chain having a cross-sectional area S and a length L. If the chain extends by $\Delta L(=L-L0)$, the elastic modulus in tension E is:

$$E=\sigma n/\epsilon n=(F/S)/(\Delta L/L) \quad (1)$$

[in which E represents an elastic modulus in tension, $\sigma n$ represents a tensile stress and $\epsilon n$ represents a tensile strain $\Delta L/L$.] The theoretical strength $\sigma b$ at the time of destruction is:

$$\sigma b = F_{max}/S = (k_1 D/8)^{1/2}/S$$

[in which Fmax represents the maximum stress and D represents a bonding energy.]

From the viewpoint of the mechanical properties, based on the theoretical crystal elastic modulus and theoretical strength as information which can be obtained at present and the carry-over values of the elastic modulus in tension and tensile strength of the actual fiber, the rigid polymer will be expressed as follows.

TABLE 1

| theoretical value | carry-over value |
|---|---|
| theoretical crystal elastic modulus [GPa] 150 or more | elastic modulus in tension [GPa] 100 or more |
| theoretical strength [GPa] 2.0 or more | tensile strength [GPa] 2.0 or more |

Examples of the rigid polymer which meets the physical conditions described above may include polymers having a repeated unit structure of the following chemical formula I.

$$—Ar—(X)_n—Ar'— \quad (I)$$

wherein,

Ar is 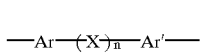

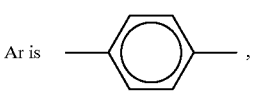

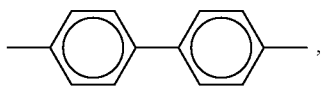

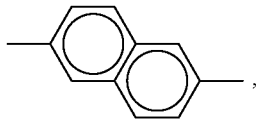

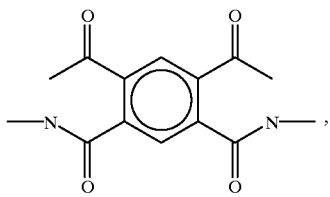

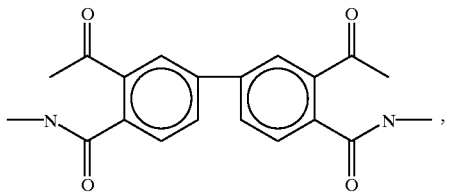

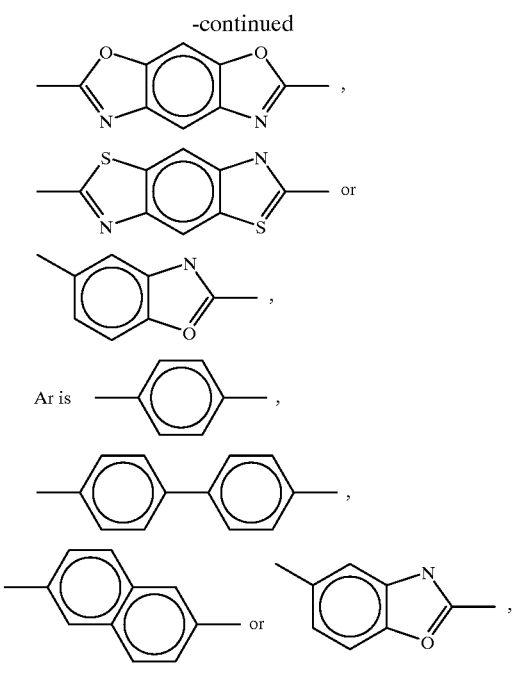

X is —CH═N—, —COO—, —N═N(O)—,
—CONH—, —N═N—, —C≡C—, or
—CH═CH—, n is 0 or 1.

All the above benzene rings may have a substituent such as an alkyl group, halogen and so on. Among the rigid polymers represented by such a chemical formula, the following monomer may be selected in order to make a resulting polymer be capable of used the present invention: examples of the rigid polymer may include aromatic polyester and its derivatives composed of aromatic hydroxy acids or aromatic diols in combination with aromatic dicarboxylic acids and aromatic polyamide and its derivatives composed of aromatic amino acids or aromatic diamines in combination with aromatic dicarboxylic acids and the derivatives thereof. Moreover, examples of said rigid polymer may also include ones produced by using said monomers modified to enhance the reaction activities of the functional groups. Examples of said rigid polymer may include polyoxybenzoyl (poly-p-benzoate) (represented by the following chemical formula III) composed of p-acetoxybenzoic acid and its derivatives (represented by the following chemical formula II) as a monomer, poly-p-benzamide and the derivatives thereof (represented by the following chemical formula V) composed of p-acetamidebenzoic acid and the derivatives thereof (represented by the following chemical formula IV), poly (p-phenylene terephtalamide), polyazomethyn, poly (p-phenylene pyromellitimide), polybenzobisoxazol, polybenzobisthiazol, polybenzoxazol and so on.

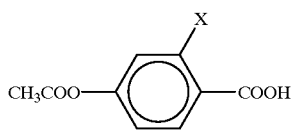

(II)

Wherein X is H, Cl, $CH_3$, $C_6H_5$.

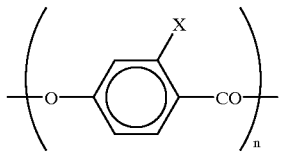

(III)

Wherein X is H, Cl, $CH_3$, $C_6H_5$.

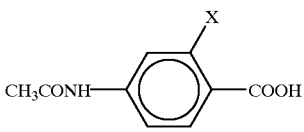

(IV)

Wherein X is H, Cl, $CH_3$, $C_6H_5$.

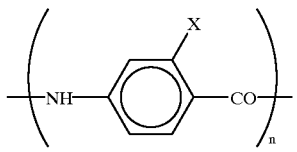

(V)

Wherein X is H, Cl, $CH_3$, $C_6H_5$.

Examples of the thermoplastic polymer (A) and (A') used in the present invention may include general polymers which does not belong to category of the above-mentioned rigid polymer and in particular among them, the preferable examples may include polymers having an ester bonding, an amide bonding or both of them in the molecular chain and having a carboxylic group, an amino group, a hydroxyl group and a functional group modified to enhance reaction activity of these groups at the end of the molecular chain. Examples of such a polymer may include polyamides such as nylon 6 (PA-6), nylon 66 (PA-66), etc.; and polyesters such as polycarbonate (PC), polyethylene terephthalate (PET), polybuthylene terephthalate (PBT), etc.

The typical combination of the thermoplastic polymer (A) and the thermoplastic polymer (A') compatible with the said polymer (A) may be given as follows.

Aromatic nylon (the trade name MXD-6: manufactured by Mitsubishi Gas Chemical Co.,Ltd.) is suitable for nylon 6 and nylon 66.

Poly-ε-caprolacton, polybutylene terephthalate and polyethylene terephthalate are suitable for polycarbonate.

Polyestercarbonate and bisphenol A-polycarbonate are suitable for polyethylene terephthalate.

Polybisphenol A-terephthalate and bisphenol A-polycarbonate are suitable for polybutylene terephthalate.

The polymer composite according to the present invention comprises a rigid polymer (corresponding to a rod-like reinforcing material) dispersed microscopically at the molecular level and the rigid polymer preferably has a cross-sectional diameter of $0.07\mu$ or less when cut at right angles to the longitudinal direction. The cross-sectional diameter of the rod-like reinforcing material means a diameter measured when there is corrected to a corresponding circle a gathering part of the rigid polymers in the composite material (a crowded part of the rod-like rigid polymers in the matrix of the flexible polymer) and it is cut at right angles to the longitudinal direction.

In order to obtain the cross-sectional diameter of 0.07 μm or less in the rod-like reinforcing material (the rigid polymer part) when it is cut at right angles to the longitudinal direction, it is preferable to use the non-solvent method according to the present invention.

Concrete examples of the monomer to form the rigid polymer may include p-acetoxybenzoic acid, p-hydroxybenzoate chloride, p-hydroxybenzoate phenyl, etc. in case of poly(p-oxybenzoyl); and p-acetaminobenzoic acid, p-aminobenzoate chloride, etc. in case of poly(p-benzamide).

In the method according to the present invention, it is particularly required to carry out polymerization with no solvent in the molten and mixed state. To be concrete, the thermoplastic polymer (A and A') and the monomer to form the rigid polymer (B) are molten and mixed in a reactor, a biaxial extruder or the like. For example, in case of p-acetoxybenzoic acid, both the polymerization of the monomer and the exchange reaction of the monomer with the thermoplastic polymer are proceeded at the same time by raising the temperature up to 250 to 300° C. The following melting and mixing of the remaining thermoplastic polymer (A) is performed at the temperature of 250° C. or less at which the abovementioned reaction is inhibited, with the result that the desired composite can be obtained.

The above processes can be carried out by using a continuous process in the biaxial extruder and the like. In that case, a temperature at a front half part of a cylinder in the biaxial extruder may be adjusted to that at which the prescribed polymerization and exchange reactions can be carried out and a temperature at a rear part to that at which such reactions cannot proceed. For example, in the case that the rigid polymer is polyoxybenzoyl or poly(p-benzamide), the monomer of which is, respectively, p-acetoxybenzoic acid or p-acetaminobenzoic acid, the temperature at the front half part of the cylinder is adjusted to 250 to 300° C. and the temperature of the rear half part to 250° C. or less where the copolymer A-B or A'-B and the thermoplastic polymer A are molten, with the result that the desired composite material can be obtained. As far as the method of the present invention is followed, there is no limit to the processing equipment which is used for the material adjustment according to the present invention.

The additive, polymerization initiator and the like may be blended at the time of melting and mixing of the present invention.

The present invention will become apparent from the following description of embodiments. The embodiments are not intended as a definition of the limits of the invention.

EXAMPLE 1

50 g of nylon 6 was placed in the reactor equipped with a stirrer, nitrogen-induction tube and excurrent tube and was molten at 225° C. under the nitrogen atmosphere. 50 g of p-acetoxybenzoic acid was added consecutively to the said and both of them were mixed uniformly. The temperature was raised gradually up to 260° C. and the reaction was initiated. The kneading reaction was performed at this temperature for four hours and the deacetic acid polymerization and ester-amide exchange reaction were proceeded. Acetic acid and water, which were by-products, were removed out of the system by reducing pressure. After that, the temperature was lowered to 210° C. and the polymerization was performed under the nitrogen atmosphere for 12 hours.

Thus resulting reaction product was crushed and washed with acetone and methanol. The reaction product nylon/POB (polyoxybenzoyl) (weight ratio; 50:50) showed no optical anisotropy during melting under a polarization microscope. It was confirmed that the resulting composite was molten at melting point of nylon 6 or higher .

EXAMPLE 1-1

0.028 g of the reaction product: nylon/POB (50/50) and 1.372 g of nylon 6 (weight ratio; 98/2) were kneaded at 230° C. for 4 minutes in the miniature injection molding machine (MINI-MAX MOLDER CS-183MMX, Custom Scientific Instruments. INC) and were blended uniformly. The composite nylon 6/POB (weight ratio; 99/1), which was obtained by blending, was injected and molded from this miniature kneader into the test piece mold to give samples for a tensile test.

Embodiment 1-2~6

Each composite of nylon-6/POB (weight ratio; 98.5/1.5), (weight ratio; 98/2), (weight ratio; 97.5/2.5), (weight ratio; 95/5), (weight ratio; 90/10) was prepared and subjected to the tension test in the same way as Example 1—1.

The resulting samples for the tensile test as described above were subjected to the tensile test according to the following way.

Tensile tester (MINI-MAX TENSILE TESTER CS-183TE, custom Scientific Instruments. INC)

Tensile rate: 0.566 cm/min

Distance between standard lines of the test sample L=0.9 cm

Diameter: D=0.1587 cm

Strain rate: 0.629/min

Measuring temperature: 22° C.

Figure 2:
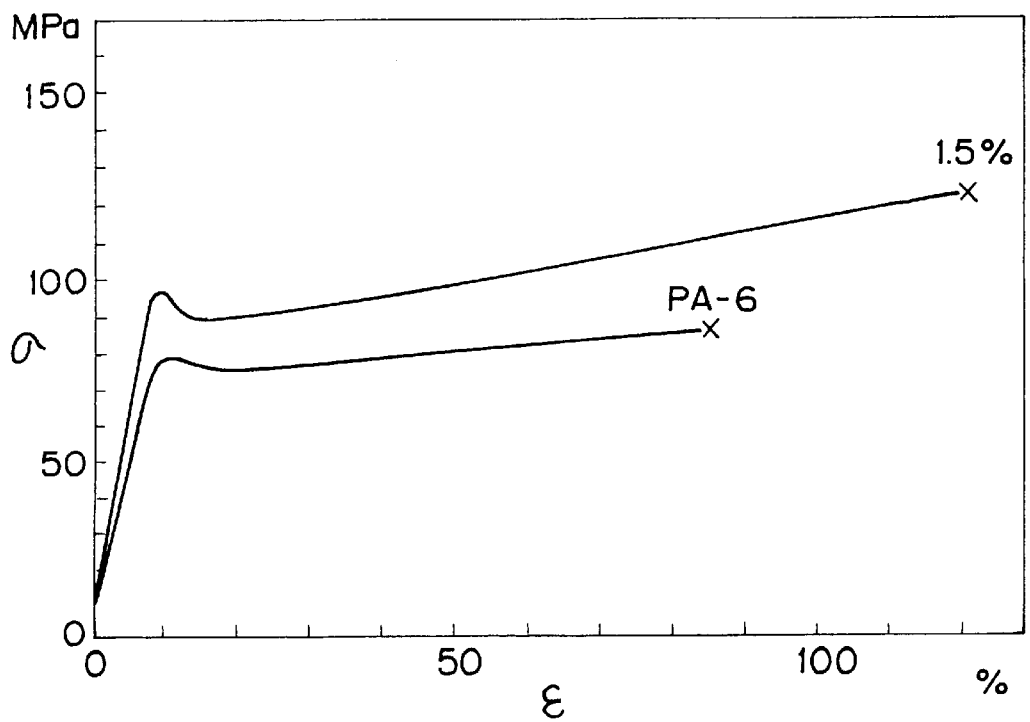
FIG. 2 is a graph showing a comparison between the stress-strain curve of only the matrix polymer (PA-6) and the representative curve of the micro fiber reinforced composite (PA-6/POB) according to the present invention.

The measured physical properties and the stress-strain curve of the representative physical properties are shown in Table 2 and FIG. 2, respectively.

It is obvious that, from the above results, the compositing of poly(oxybenzoil) at the molecular level enhance extremely the strength, elastic modulus and tension of nylon 6.

TABLE 2

| POB CONTENT wt % | E [GPa] | σy [MPa] | σb [MPa] | ε [%] | |
|---|---|---|---|---|---|
| 0 | 0.92 | 76 | 82 | 82 | Nylon-6 only |
| 1 | 1.42 | 88 | 98 | 84 | |
| 1.5 | 1.46 | 93 | 117 | 115 | Representative property S-S curve |
| 2 | 1.54 | 90 | 107 | 110 | |
| 2.5 | 1.54 | 90 | 90 | 146 | |
| 5 | 1.18 | 88 | 107 | 134 | |
| 0.00 | 1.73 | — | 74 | 7.6 | |

EXAMPLE 2

30 g of polycarbonate and 30 g of p-acetoxybenzoic acid was placed in the reactor equipped with a stirrer, nitrogen-induction tube and excurrent tube and was molten at 225° C. under the nitrogen atmosphere while both of them were mixed uniformly. The temperature was raised gradually up to 280° C. and the reaction was initiated. The kneading reaction was performed at this temperature for 3 hours and the deacetic acid polymerization and ester-amid exchange reaction were proceeded. Acetic acid and water, which were by-products, were removed out of the system by nitrogen gas flow.

Thus resulting reaction product polycarbonate/POB (polyoxybenzoyl) (weight ratio; 50:50) was molten at 240° C. at which matrix polycarbonate can be molten.

EXAMPLE 2-1

0.14 g of the reaction product: polycarbonate(PC)/POB (50/50) and 1.26 g of polycarbonate were kneaded at 240° C. for 4 minutes in the miniature injection molding machine (MINI-MAX MOLDER CS-183MMX, Custom Scientific Instruments. INC) and were blended uniformly. The composite PC/POB (weight ratio; 95/5), which was obtained by blending, was injected into a mold from this miniature kneader into the test piece mold to give samples for a tensile test.

Embodiment 2-2~3

Each composite of PC/POB (weight ratio; 90/10), (weight ratio; 97/3) was prepared and subjected to the tensile test in the same way as Example 1-1.

TABLE 3

| POB CONTENT wt % | E [GPa] | σy [MPa] | σb [MPa] | ε [%] |
|---|---|---|---|---|
| 0 | 0.996 | 72.9 | 73.4 | 61.0 |
| 3 | 1.001 | 74.4 | 78.8 | 66.0 |
| 5 | 1.008 | 75.9 | 97.2 | 73.9 |
| 10 | 1.011 | 77.3 | 86.3 | 53.2 |

Figure 3:
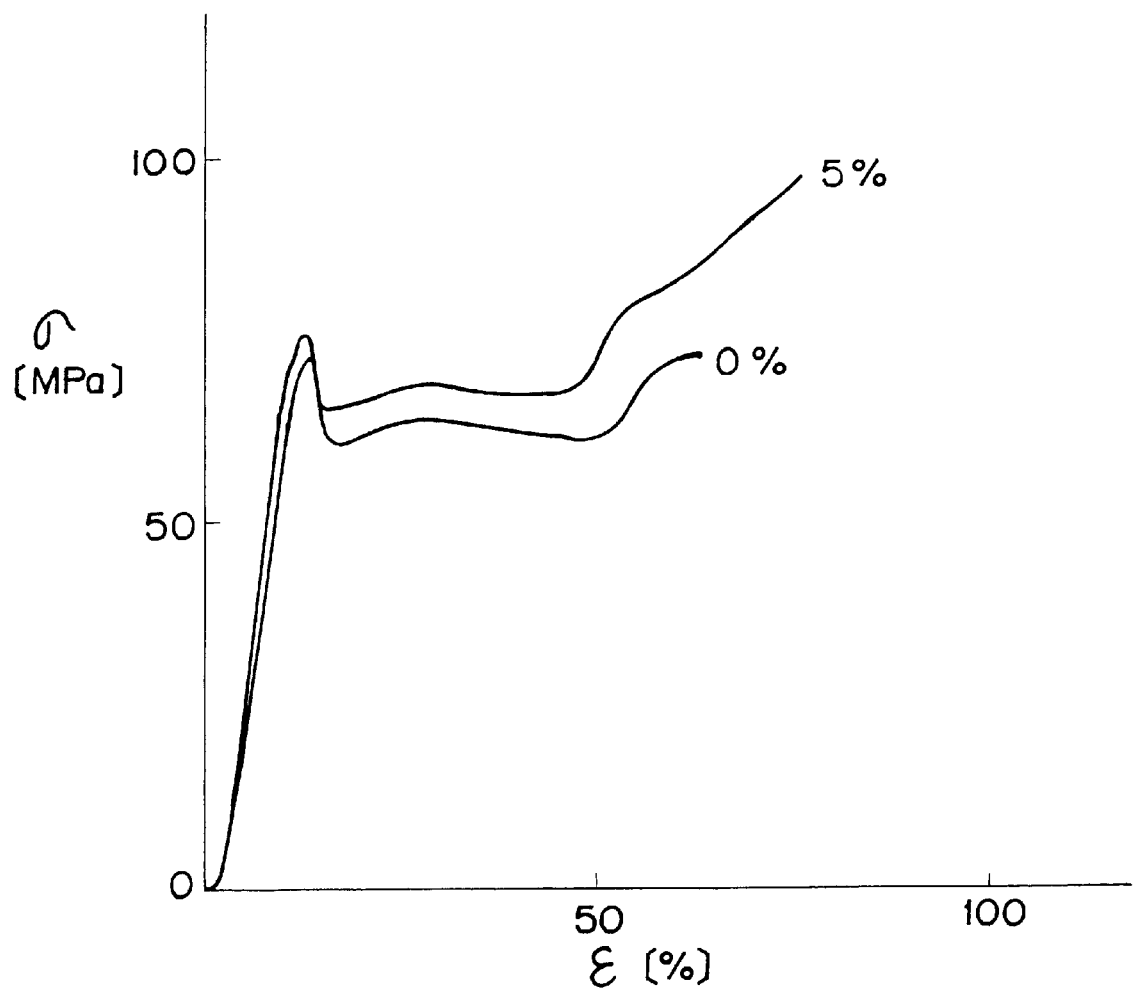
FIG. 3 is a graph showing a comparison between the stress-strain curve of only the matrix polymer (PC) and the representative curve of the micro fiber reinforced composite (PC/POB) according to the present invention.

The measured physical properties and the stress-strain curve of the representative physical properties are shown in Table 3 and FIG. 3, respectively.

It is obvious that, from the above results, the compositing of poly(oxybenzoyl) at the molecular level enhanced extremely the strength, elastic modulus and tension of polycarbonate.

What is claimed:

1. A non-liquid crystal polymer composite material consisting essentially of two or more kinds of polymers including a reinforcing component comprising polyoxybenzoyl (POB) forming rigid molecular chains in a rod-like form having a cross-sectional diameter of 0.07 μm or less when cut a right angles to the longitudinal direction of said chains and a matrix component comprising nylon, wherein at least a part of said reinforcing component comprises a copolymer of nylon and POB, the POB of said reinforcing component is dispersed microscopically at the molecular level in the reinforcing component so that the reinforcing component shows no optical anisotropy under a polarizing microscope during melting and the nylon of the reinforcing component is covalently bonded to the POB of the reinforcing component.

2. The polymer composite material according to claim 1, wherein substantially all of the reinforcing component is made up of the copolymer of nylon and POB.

3. A non-liquid crystal polymer composite material consisting essentially of two or more kinds of polymers including a reinforcing component comprising polyoxybenzoyl (POB) forming rigid molecular chains in a rod-like form having a cross-sectional diameter of 0.07 μm or less when cut a right angles to the longitudinal direction of said chains and a matrix component comprising nylon, wherein said reinforcing component comprises a copolymer of nylon and POB, the POB of said reinforcing component is dispersed microscopically at the molecular level in the reinforcing component so that the the reinforcing component shows no optical anisotropy under a polarizing microscope during melting, and the nylon in the reinforcing component is covalently bonded to the POB in the reinforcing component, further wherein the reinforcing component is produced by melting a mixture of a monomer precursor of POB and nylon in a reactor or extruder to carry out polymerization of the monomer and an exchange reaction between the monomer and nylon, and the polymer composite material is made by melting additional nylon and mixing the additional nylon with the reinforcing component.

4. The composite material according to claim 1 or 3, wherein the POB is represented by formula (III)

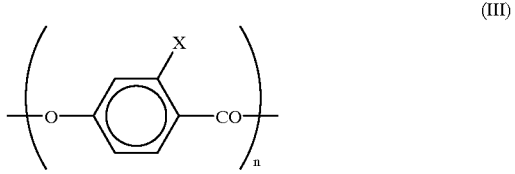

wherein X is selected from the group consisting of H, Cl, $CH_3$, and $C_6H_5$.

5. The composite material according to claim 3, wherein the monomer is represented by formula (II)

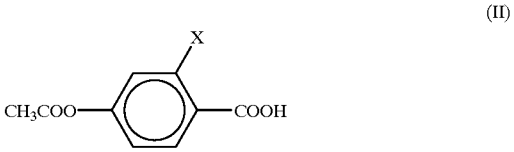

wherein X is selected from the group consisting of H, Cl, $CH_3$, and $C_6H_5$.

6. The polymer composite material according to claim 3, wherein the polymerization and the exchange reaction of the monomer with the nylon are carried out in the absence of solvent.

7. The polymer composite material according to claim 6, wherein the polymerization and the exchange reaction of the monomer with the nylon are carried out at a temperature of 250 to 300° C.

8. The polymer composite material according to claim 3, wherein the mixing of the reinforcing component and the nylon are carried out at a temperature of 250° C. or less to inhibit further polymerization and exchange reaction of the monomer with the nylon.

9. The polymer composite material according to claim 3, wherein the monomer and the nylon are mixed in a 50:50 ratio by weight to form the reinforcing component.

10. The polymer composite material according to claim 3, wherein the matrix component and the reinforcing component are mixed at a ratio by weight of 99:1 to 95:5.

11. A method of producing a non-liquid crystal polymer composite material, comprising:

providing a monomer precursor of polyoxybenzoyl (POB) and nylon, mixing the monomer precursor of POB and nylon in a reactor or extruder to carry out polymerization of the monomer and an exchange reaction between the monomer and nylon to produce a reinforcing component of the polymer composite material, and producing the polymer composite material by melting additional nylon and mixing the additional nylon with the reinforcing component, wherein the POB of said reinforcing component is dispersed microscopically at the molecular level in the reinforcing component so that the reinforcing component shows no optical anisotropy under a polarizing microscope during melting and the nylon of the reinforcing component is covalently bonded to the POB of the reinforcing component.

12. The method according to claim 11, wherein the polymerization and the exchange reaction of the monomer are carried out in the absence of solvent.

13. The method according to claim 11, wherein the polymerization and the exchange reaction of the monomer with the nylon are carried out at a temperature of 250 to 300° C.

14. The method according to claim 11, wherein the mixing of the reinforcing component and the nylon are carried out at a temperature of 250° C. or less to inhibit further polymerization and exchange reaction of unreacted monomer with the nylon.

15. The method according to claim 11, wherein the monomer and the nylon are mixed in a 50:50 ratio by weight to form the reinforcing component.

16. The method according to claim 11, wherein the matrix component and the reinforcing component are mixed at a ratio by weight of 99:1 to 95:5.

17. The method according to claim 11, wherein the mixing of the monomer and the nylon to form the reinforcing component is carried out in an extruder having a front portion at a temperature of 250 to 300° C. and a rear portion at a temperature of 250° C. or less.

* * * * *